United States Patent
Wang et al.

(10) Patent No.: US 11,281,632 B2
(45) Date of Patent: Mar. 22, 2022

(54) OBJECT INFORMATION PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Nan Wang, Shenzhen (CN); Zheng Chen, Shenzhen (CN); Jinming Liu, Shenzhen (CN); Hongwen Huang, Shenzhen (CN); Xiaoqian Zhan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 700 days.

(21) Appl. No.: 16/207,570

(22) Filed: Dec. 3, 2018

(65) Prior Publication Data
US 2019/0102341 A1 Apr. 4, 2019

Related U.S. Application Data

(63) Continuation of application No. PCT/CN2017/087551, filed on Jun. 8, 2017.

(30) Foreign Application Priority Data

Jul. 7, 2016 (CN) .......................... 201610533341.4

(51) Int. Cl.
*G06F 16/10* (2019.01)
*G06F 16/182* (2019.01)
(Continued)

(52) U.S. Cl.
CPC ............ *G06F 16/183* (2019.01); *G06F 16/13* (2019.01); *G06F 16/148* (2019.01); *G06F 16/1727* (2019.01); *G06F 16/182* (2019.01)

(58) Field of Classification Search
CPC ............................. G06F 16/13; G06F 16/1727
See application file for complete search history.

(56) References Cited

U.S. PATENT DOCUMENTS

2006/0106878 A1 5/2006 Shitomi et al.
2009/0327624 A1 12/2009 Tamura et al.
(Continued)

FOREIGN PATENT DOCUMENTS

CN   101719141 A   6/2010
CN   102110146 A   6/2011
(Continued)

OTHER PUBLICATIONS

The European Patent Office (EPO) The Extended European Search Report for 17823494.4 dated Mar. 28, 2019 9 Pages.
(Continued)

*Primary Examiner* — Kristopher Andersen
(74) *Attorney, Agent, or Firm* — Anova Law Group, PLLC

(57) ABSTRACT

An object information processing method includes obtaining an information creation request. The information creation request carries a first address identifier of a target object. The target object includes a subdirectory or a sub-file. The method further includes determining a second address identifier of a parent directory to which the target object belongs according to the first address identifier, searching for an information storage area storing metadata of the parent directory according to the second address identifier, and performing data updating for the information storage area according to the first address identifier to create an association relationship between the parent directory and the target object in the metadata.

13 Claims, 5 Drawing Sheets

(51) Int. Cl.
  *G06F 16/13* (2019.01)
  *G06F 16/14* (2019.01)
  *G06F 16/17* (2019.01)

(56) References Cited

U.S. PATENT DOCUMENTS

| | | | | |
|---|---|---|---|---|
| 2013/0339406 A1* | 12/2013 | Kanfi | ............... | G06F 16/289 |
| | | | | 707/825 |
| 2014/0310241 A1* | 10/2014 | Goyen | ............... | G06F 16/178 |
| | | | | 707/634 |
| 2015/0278397 A1 | 10/2015 | Hendrickson et al. | | |
| 2015/0302111 A1* | 10/2015 | Yue | ............... | G06F 16/188 |
| | | | | 707/827 |

FOREIGN PATENT DOCUMENTS

| CN | 103902632 A | 7/2014 |
|---|---|---|
| CN | 104123359 A | 10/2014 |
| CN | 104239316 A | 12/2014 |
| CN | 104754001 A | 7/2015 |
| CN | 106202367 A | 12/2016 |
| WO | 0250714 A2 | 6/2002 |

OTHER PUBLICATIONS

Ana Aviles-Gonzalez et al, "Scalable Metadata Management Through OSD+ Devices," International Journal of Parallel Programming., vol. 42, No. 1, Jul. 25, 2012 (Jul. 25, 2012), pp. 4-29, XP055572704, US ISSN: 0885-7458, DOI: 10.1007/s10766-012-0207-8 26 pages.

The World Intellectual Property Organization (WIPO) International Search Report for PCT/CN2017/087551 dated Aug. 30, 2017 6 Pages (including translation).

The State Intellectual Property Office of the People's Republic of China (SIPO) Office Action 1 for 201610533341.4 dated Oct. 17, 2018 7 Pages (including translation).

* cited by examiner

OBJECT INFORMATION PROCESSING METHOD AND APPARATUS, AND STORAGE MEDIUM

CROSS-REFERENCE TO RELATED APPLICATIONS

This application is a continuation of International Application No. PCT/CN2017/087551, filed on Jun. 8, 2017, which claims priority to Chinese Patent Application No. 201610533341.4, filed with the Chinese Patent Office on Jul. 7, 2016, and entitled "OBJECT INFORMATION PROCESSING METHOD AND APPARATUS," the entire contents of both of which are incorporated herein by reference.

FIELD OF THE TECHNOLOGY

This disclosure relates to the field of computer technologies, and specifically, to an object information processing method and apparatus, and a storage medium.

BACKGROUND OF THE DISCLOSURE

An object storage system is a storage model in parallel with conventional block storage and file storage, combines the advantages of network attached storage and a storage area network, and has become a research focus in the network storage field.

An object storage system includes a user terminal, a metadata server, an object storage device, and an interconnection network. In consideration of performance, usually, most of object storage systems use a flat data organizational structure. That is, each storage space of the object storage system is divided into several "containers" (also referred to as "buckets"), and an object (such as a directory object or a file object) is placed in a container. An object cannot be directly placed in root storage space, and needs to be placed in a container, and cannot be nested. That is, a layer of containers cannot be placed in a container, and only an object can be placed in the container.

SUMMARY

In accordance with the disclosure, there is provided an object information processing method including obtaining an information creation request. The information creation request carries a first address identifier of a target object. The target object includes a subdirectory or a sub-file. The method further includes determining a second address identifier of a parent directory to which the target object belongs according to the first address identifier, searching for an information storage area storing metadata of the parent directory according to the second address identifier, and performing data updating for the information storage area according to the first address identifier to create an association relationship between the parent directory and the target object in the metadata.

Also in accordance with the disclosure, there is provided an object information processing apparatus including one or more processors and one or more memories storing one or more programs that, when executed by the one or more processors, cause the one or more processors to obtain an information creation request. The information creation request carries a first address identifier of a target object. The target object includes a subdirectory or a sub-file. The one or more programs further cause the one or more processors to determine a second address identifier of a parent directory to which the target object belongs according to the first address identifier, search for an information storage area storing metadata of the parent directory according to the second address identifier, and perform data updating for the information storage area according to the first address identifier to create an association relationship between the parent directory and the target object in the metadata.

Also in accordance with the disclosure, there is provided a computer readable storage medium storing computer readable instructions that, when executed by at least one processor, cause the at least one processor to obtain an information creation request. The information creation request carries a first address identifier of a target object. The target object includes a subdirectory or a sub-file. The computer readable instructions further cause the at least one processor to determine a second address identifier of a parent directory to which the target object belongs according to the first address identifier, search for an information storage area storing metadata of the parent directory according to the second address identifier, and perform data updating for the information storage area according to the first address identifier to create an association relationship between the parent directory and the target object in the metadata.

BRIEF DESCRIPTION OF THE DRAWINGS

To describe the technical solutions in the embodiments of this disclosure, the following briefly describes the accompanying drawings illustrating embodiments of the disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following clearly and completely describes the technical solutions in the embodiments of this disclosure with reference to the accompanying drawings in the embodiments of this disclosure. Apparently, the described embodiments are merely some but not all of the embodiments of this disclosure. All other embodiments obtained by a person skilled in the art based on the embodiments of this disclosure without creative efforts shall fall within the scope of this disclosure.

In some embodiments, although normal object storage can satisfy most of Internet applications, there is no directory structure in such a storage manner, and if a user needs to traverse objects in a container, usually, the user needs to perform recording, for example, record a stored file list by using a relational database such as a structured query language (microsoft structure quest language, mysql). Consequently, an operation method is complex, and traversal efficiency is low.

To solve the foregoing technical problem, this disclosure provides an object information processing method, apparatus, and system.

Figure 1A:
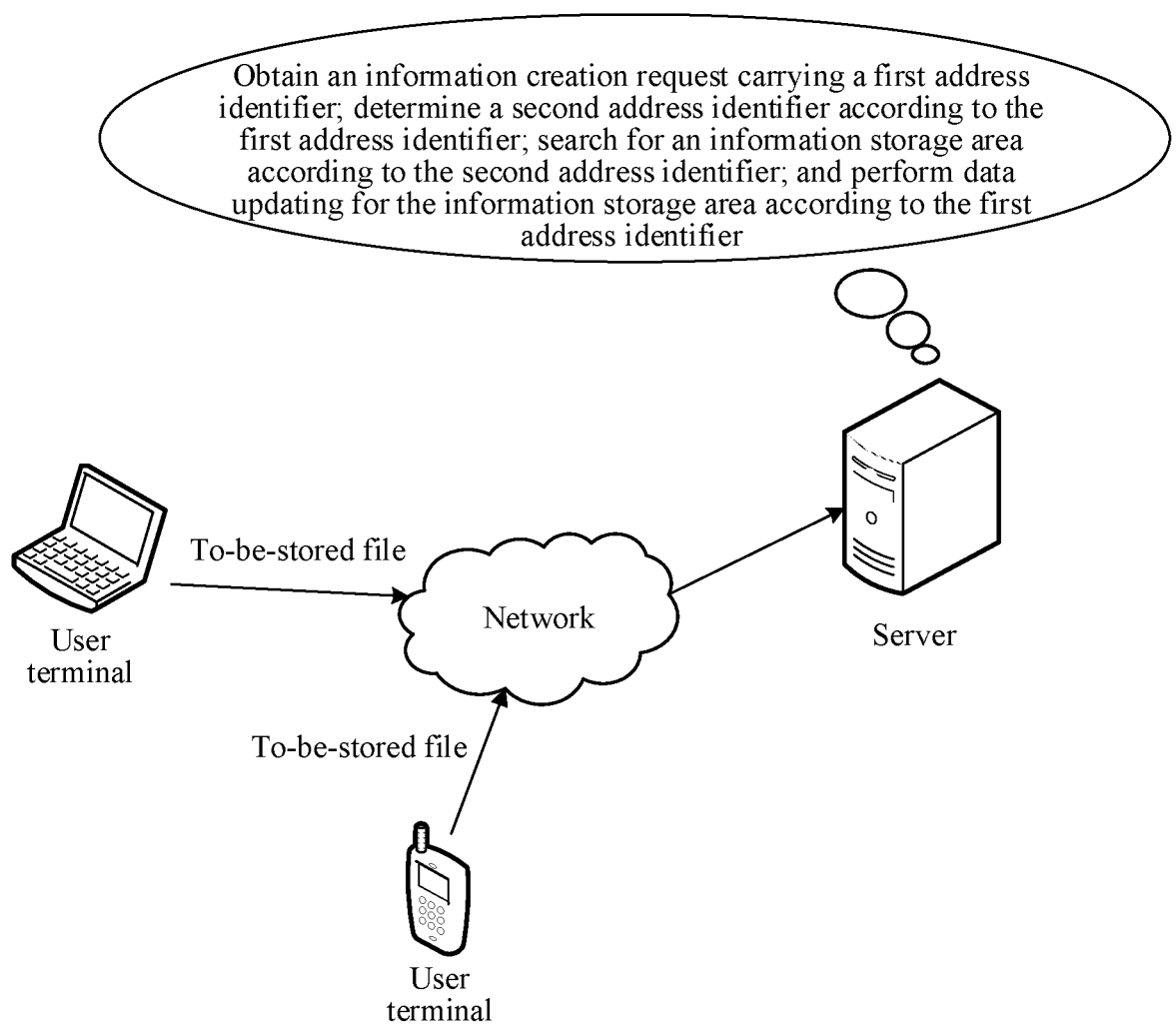
FIG. 1a is a schematic diagram of a scenario of an object information processing system according to an embodiment of this disclosure.

Referring to FIG. 1a, the object information processing system may include a server, and any one of object information processing apparatuses provided in embodiments of this disclosure can be integrated in the server. The server is mainly applied to an object storage system, and may be a single integrated server, or may include multiple servers. In addition, the object information processing system may further include another device such as a user terminal. The user terminal is connected to the server by using a network.

The server may obtain an information creation request, the information creation request carrying a first address identifier of a target object, and the target object including a subdirectory or a sub-file; determine, according to the first address identifier, a second address identifier of a parent directory to which the target object belongs; search for a corresponding information storage area according to the second address identifier, the information storage area being used to store metadata of the parent directory; and then perform data updating for the information storage area according to the first address identifier, to create an association relationship between the parent directory and the target object in the metadata. The first address identifier and the second address identifier may be storage path information of the object in the server. The second address identifier may be storage path information ended with "/". The metadata is mainly used to describe attribute information of object data, and metadata of one object can be uniquely located by using storage path information. When the user terminal uploads a to-be-stored file to the server by using the network, the server determines, according to storage path information of the to-be-stored file in the server, whether the to-be-stored file is a target object; and if yes, the server generates an information creation request, and updates, according to the storage path information, data for an information storage area of a parent directory to which the target object belongs, to create an association relationship between the target object and the parent directory, so as to create a hierarchical directory structure in the object storage system.

Detailed descriptions are provided below. It should be noted that sequence numbers of embodiments, if any, are not intended to limit preference orders of the embodiments of this disclosure.

Figure 1B:
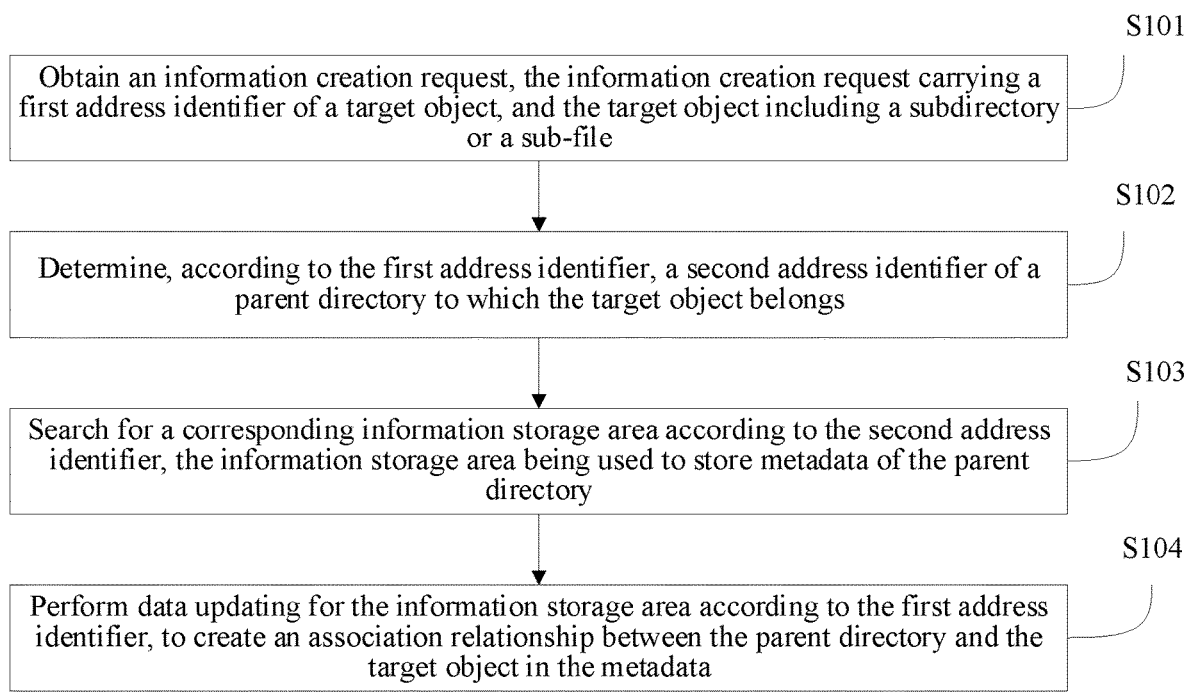
FIG. 1b is a flowchart of an object information processing method according to an embodiment of this disclosure.

The present disclosure provides an object information processing method. The method may be applied to an object information processing apparatus in a server. As shown in FIG. 1b, a specific procedure of the object information processing method may be as follows.

S101: Obtain an information creation request, the information creation request carrying a first address identifier of a target object, and the target object including a subdirectory, a sub-file, or the like.

In some embodiments, when a user terminal uploads a to-be-stored file to the server by using a network, the server determines, according to storage path information of the to-be-stored file in the server, whether the to-be-stored file is a target object. If yes, the server generates an information creation request, and sends the request to the object information processing apparatus in the server. The first address identifier is mainly storage path information of the target object in the server. Specifically, if an object currently stored in the server is a subdirectory or a sub-file (that is, a target object), the server automatically generates an information creation request.

It should be noted that, it may be considered that an object whose storage path information is ended with "/" is a parent directory or a subdirectory, and an object whose storage path information is not ended with "/" is a file or a sub-file. Generally, multiple subdirectories and sub-files may be stored in one parent directory, the parent directory may belong to a higher-level directory, or may not belong to any directory (for example, the parent directory is a root directory). Storage path information of the parent directory is generally a prefix portion of storage path information of a subdirectory or a sub-file in the parent directory. For example, if an object whose storage path information is W:/a/b is a target object, storage path information corresponding to a parent directory to which the target object belongs is W:/a/, and storage path information corresponding to a higher-level directory (that is, a parent directory of the parent directory) to which the parent directory belongs is W:/.

Not all storage objects are target objects. For example, there is no higher-level directory (a parent directory) for an object whose storage path information is W:/, and therefore, the object is not a subdirectory or a sub-file, that is, the object is not a target object. Therefore, before generating an information creation request, the server further may need to determine whether a storage object is a target object. In some embodiments, the server may determine that the storage object is a target object only when there is a higher-level directory (a parent directory) for the storage object. When determining that the storage object is a target object, the server may generate the information creation request.

S102: Determine, according to the first address identifier, a second address identifier of a parent directory to which the target object belongs.

In some embodiments, the second address identifier may include storage path information of the parent directory. Generally, a subdirectory or a sub-file is stored in a parent directory, and therefore, storage path information of the subdirectory or the sub-file may be highly associated with storage path information of the parent directory. Generally, a prefix portion of the first address identifier may be determined as the second address identifier.

S103: Search for a corresponding information storage area according to the second address identifier, the information storage area being used to store metadata of the parent directory.

In some embodiments, the metadata is mainly used to describe an attribute of object data, and supports a function of indicating a storage location or historical data, resource searching, file recording, or the like. It should be noted that, when storing each object, the server may create metadata of the object based on storage path information of the object. Therefore, a corresponding information storage area can be located by using storage path information (that is, an address identifier).

S104: Perform data updating for the information storage area according to the first address identifier, to create an association relationship between the parent directory and the target object in the metadata.

In some embodiments, to facilitate searching, in addition to storing the metadata of the parent directory in the information storage area, multiple specified areas may be further created in the information storage area to store the association relationship between the parent directory and the target object.

For example, the information storage area may include a first area and a second area. In this case, performing the data updating for the information storage area (S104) may include determining a target sub-area in the first area according to the first address identifier, and storing the first address identifier in the target sub-area, to perform data updating for the first area (11).

Further, the first area may include multiple created storage sub-areas, the second area may include multiple stored pointers, and each pointer points to one of the storage sub-areas. In this case, determining the target sub-area in the first area according to the first address identifier may include searching the first area for a corresponding storage sub-area according to the first address identifier; detecting a current remaining capacity of a found storage sub-area; and determining the target sub-area in the first area according to the remaining capacity.

It can be understood that, the pointer can be an object in a programming language, and a value of the pointer may directly point to a value of another place in the server by using an address. In some embodiments, the storage sub-area is in a one-to-one correspondence with the pointer, and a required storage sub-area can be found by using a pointer. The storage sub-area is used to store an address identifier. Each storage sub-area may include consecutive storage blocks, in which several address identifiers are stored. The address identifiers may be sorted according to a preset order; and the preset order may be determined according to an actual application requirement. For example, the address identifiers may be sorted in ascending order according to a lexicographic order. In this case, the pointers may be sorted according to a lexicographic order of minimum address identifiers in storage sub-areas to which the pointers point to. The target sub-area may be a created storage sub-area, or may be a to-be-created storage sub-area, and may be specifically determined according to the remaining capacity of the found storage sub-area. The remaining capacity may include full storage and non-full storage.

In some embodiments, determining the target sub-area in the first area according to the remaining capacity may include creating a new storage sub-area in the first area when the remaining capacity indicates full storage; migrating a data portion in the found storage sub-area to the new storage sub-area according to a preset policy; and selecting either the found storage sub-area or the new storage sub-area as the target sub-area according to the first address identifier. In some other embodiments, determining the target sub-area in the first area according to the remaining capacity may include using the found storage sub-area as the target sub-area when the remaining capacity indicates non-full storage.

In some embodiments, the preset policy may be equipartition. That is, quantities of address identifiers stored in the found storage sub-area and the new storage sub-area are made to be roughly the same. In this way, frequency of creating a new storage sub-area can be reduced to the greatest extent.

In some embodiments, a quantity of address identifiers that can be stored in each storage sub-area is N. When N address identifiers are already stored in the found storage sub-area, the remaining capacity indicates full storage. In this case, if an $(N+1)^{th}$ address identifier (that is, the first address identifier) needs to be stored, a new storage sub-area may be created in the first area, and N/2 address identifiers stored in the found storage sub-area are migrated to the new storage sub-area. If address identifiers in each storage sub-area are sorted according to the lexicographic order, either the found storage sub-area or the new storage sub-area may be selected, according to a ranking of the first address identifier in a dictionary, as the target sub-area for insertion. In some embodiments, if N address identifiers are not stored in the found storage sub-area, the remaining capacity indicates non-full storage. In this case, the found storage sub-area may be directly used as the target sub-area.

In some embodiments, performing the data updating for the information storage area (S104) may further include performing data updating for the second area according to updated data in the first area (12).

In some embodiments, a pointer of a storage sub-area in the first area is stored in the second area. Therefore, when a quantity of storage sub-areas in the first area remains unchanged, data does not need to be updated for the second area. When the quantity of storage sub-areas in the first area is increased, that is, a new storage sub-area is created, a corresponding pointer may need to be added to the second area. In this case, performing the data updating for the second area may include creating a pointer of the new storage sub-area, and storing the pointer in the second area.

In some embodiments, the pointer may be created according to an address identifier already stored in the new storage sub-area and location information of the new storage sub-area.

It should be noted that, at the very beginning, no sub-file and no subdirectory are stored in the parent directory. In this case, the server may create the first area and the second area in the information storage area of the parent directory. In addition, a first storage sub-area is created in the first area, in which no address identifier is stored, and a first pointer pointing to the first storage sub-area is stored in the second area. When a subdirectory or a sub-file is newly added to the parent directory, an address identifier of the subdirectory or the sub-file is stored in the first storage sub-area, and is sorted according to a specific order. A second storage sub-area is not created until a remaining capacity of the first storage sub-area indicates full storage, and some address identifiers stored in the first storage sub-area are migrated to the second storage sub-area, so that a new address identifier can be stored in either the first storage sub-area or the second storage sub-area, and meanwhile, a second pointer pointing to the second storage sub-area is added to the second area. A same method may be used to create a third storage sub-area to an $M^{th}$ storage sub-area, and a third pointer to an $M^{th}$ pointer. Details are not described herein again.

When each sub-file or subdirectory is stored, if an association relationship between the sub-file or the subdirectory and a parent directory thereof is created in corresponding metadata according to above processes S101 to S104, subsequently, a user may perform a traversal operation on the parent directory according to an actual requirement. That is, after data is updated for the information storage area according to the first address identifier, the object information processing method may further include obtaining the second address identifier of the parent directory when a traversal operation needs to be performed on the parent directory; searching for the corresponding information storage area according to the second address identifier; sending a traversal condition setting request to a terminal, so that the terminal feeds back corresponding setting information according to the traversal condition setting request; and obtaining corresponding data from the information storage area according to the setting information, to traverse objects stored in the parent directory, where the object includes a subdirectory or a sub-file.

In some embodiments, the terminal may be a device such as a computer, a mobile phone, or a tablet computer. The traversal condition may be determined according to an actual requirement of the user, for example, a preset traversal range, a preset traversal quantity, or traversing all content. The traversal condition may be transferred to the server by using a preset interface in the terminal, and the preset interface may be a specified interface of an application interface.

In some embodiments, obtaining corresponding data from the information storage area according to the setting information may include obtaining a corresponding pointer from the second area in the information storage area according to the setting information; searching the first area in the information storage area for a corresponding storage sub-area according to the pointer; and obtaining the corresponding data from the storage sub-area according to the setting information.

In some embodiments. When receiving the setting information such as the preset traversal range fed back by the terminal, the server may first find a corresponding pointer according to the preset traversal range, find a corresponding storage sub-area according to the pointer, and then select an address identifier within the preset traversal range from the storage sub-area.

In addition, after the association relationship between the target object and the parent directory is created in the metadata, if subsequently, the user deletes the target object from an object storage system, the association relationship may also need to be correspondingly deleted. That is, after the performing data updating for the information storage area according to the first address identifier, the object information processing method may further include obtaining the first address identifier of the target object when the target object is deleted; determining the information storage area according to the first address identifier; searching the first area in the information storage area according to the first address identifier, to obtain the target sub-area; detecting a current storage status of the target sub-area; and deleting corresponding data from the information storage area according to the storage status.

In some embodiments, the storage status may include that one piece of data is already stored and multiple pieces of data are already stored. For details of a method for determining the information storage area, processes S101 to S103 described above can be referred to, and details are not described herein again. A method for searching for the target sub-area may be determined according to an actual requirement. For example, if address identifiers stored in the first area are sorted in ascending order according to the lexicographic order, the searching method may be a dichotomic search method.

In some embodiments, deleting corresponding data from the information storage area according to the storage status may include deleting the target sub-area from the first area, and deleting a pointer corresponding to the target sub-area from the second area when the storage status indicates that one piece of data is already stored. In some other embodiments, deleting corresponding data from the information storage area according to the storage status may include deleting the second address identifier from the target sub-area when the storage status indicates that multiple pieces of data are already stored.

In some embodiments, when only one piece of data (that is, the first address identifier) is stored in the target sub-area, if the first address identifier is deleted, storage in the target sub-area becomes empty. To avoid a waste of space, both the target sub-area and the pointer corresponding to the target sub-area should be deleted. When multiple pieces of data (that is, multiple address identifiers including the first address identifier) are stored in the target sub-area, after the first address identifier is deleted, storage in the target sub-area is not empty. Therefore, another deletion operation does not need to be performed.

It view of the above, according to the object information processing method provided in some embodiments, an information creation request is obtained, the information creation request carrying a first address identifier of a target object; a second address identifier of a parent directory to which the target object belongs is determined according to the first address identifier; then, a corresponding information storage area is searched for according to the second address identifier; and data is updated for the information storage area according to the first address identifier, so that a hierarchical directory structure in an object storage system can be rapidly created, thereby implementing a traversal function for a file list in a directory. An operation is simple and traversal efficiency is high.

Figure 2A:
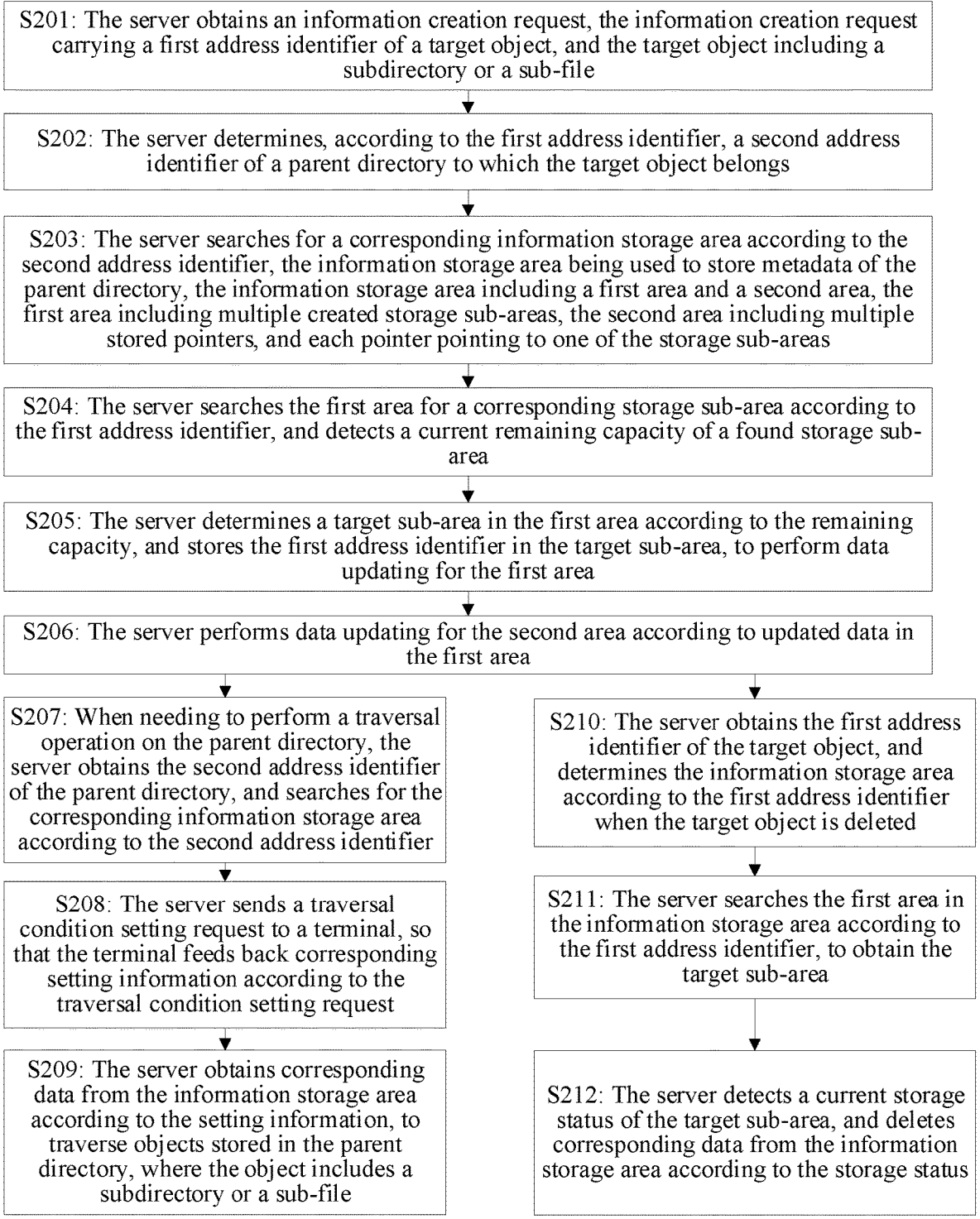
FIG. 2a is another flowchart of an object information processing method according to an embodiment of this disclosure.

FIG. 2a shows a flow chart of another object information processing method according to embodiments of the disclosure. In some embodiments, the server is integrated with an object information processing apparatus, and the server is for an object storage system. Further, the server may be a single integrated server, or may include multiple servers.

As shown in FIG. 2a, the object information processing method may be as follows.

S201: The server obtains an information creation request, the information creation request carrying a first address identifier of a target object, and the target object including a subdirectory or a sub-file.

For example, when the target object is a subdirectory, the first address identifier may be W:/a/m/. When the target object is a sub-file, the first address identifier may be W:/a/m/x. It should be noted that, in some embodiments, a processing method for a subdirectory is the same as a processing method for a sub-file. Therefore, for ease of description, in some embodiments, an example in which the target object is a sub-file or a subdirectory is used for description.

S202: The server determines, according to the first address identifier, a second address identifier of a parent directory to which the target object belongs.

For example, it may be determined, according to a prefix portion of the first address identifier W:/a/m/x, that the second address identifier of the parent directory to which the sub directory belongs is W:/a/m/.

S203: The server searches for a corresponding information storage area according to the second address identifier, the information storage area being used to store metadata of the parent directory, the information storage area including a first area and a second area, the first area including multiple created storage sub-areas, the second area including multiple stored pointers, and each pointer pointing to one of the storage sub-areas.

For example, the information storage area found by the server according to the second address identifier W:/a/m/ may be A. A includes the first area and the second area, and multiple storage sub-areas are created in the first area. Several address identifiers are stored in each storage sub-area, and the address identifiers are sorted in an ascending order according to a lexicographic order. Multiple pointers are stored in the second area. The multiple pointers are sorted according to a lexicographic order of minimum address identifiers in storage sub-areas to which the pointers point to.

S204: The server searches the first area for a corresponding storage sub-area according to the first address identifier, and detects a current remaining capacity of a found storage sub-area.

For example, if address identifiers W:/a/m/w and W:/a/m/y are stored in a storage sub-area $A_n$ in the first area, according to the lexicographic order, a storage sub-area that is found by the server according to the first address identifier W:/a/m/x is $A_n$.

S205: The server determines a target sub-area in the first area according to the remaining capacity, and stores the first address identifier in the target sub-area, to perform data updating for the first area.

For example, the target sub-area may be a created storage sub-area, or may be a to-be-created storage sub-area, and may be specifically determined according to the remaining capacity of the found storage sub-area. The remaining capacity may include full storage or non-full storage.

In some embodiments, determining, by the server, the target sub-area in the first area according to the remaining capacity may include creating a new storage sub-area in the first area when the remaining capacity indicates full storage; migrating a data portion in the found storage sub-area to the new storage sub-area according to a preset policy; and selecting either the found storage sub-area or the new storage sub-area as the target sub-area according to the first address identifier. In some other embodiments, determining, by the server, the target sub-area in the first area according to the remaining capacity may include using the found storage sub-area as the target sub-area when the remaining capacity indicates non-full storage.

Figure 2B:
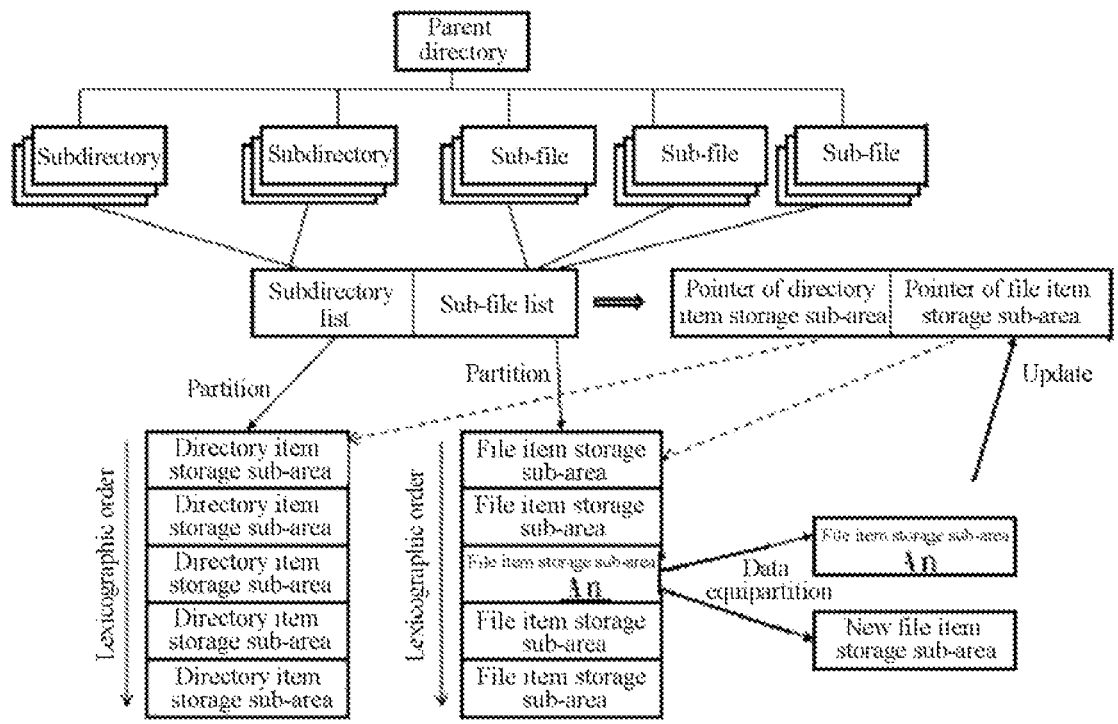
FIG. 2b is a schematic demonstration diagram of adding a sub-file to a parent directory according to an embodiment of this disclosure.

For example, a capacity of each storage sub-area is N. When N address identifiers are already stored in the storage sub-area $A_n$, the remaining capacity indicates full storage. In this case, the server creates a new storage sub-area, and migrates last N/2 address identifiers in $A_n$ to the new storage sub-area. FIG. 2b shows the details of this example. If the migrated N/2 address identifiers include the address identifier W:/a/m/w, according to the lexicographic order, the target sub-area determined according to the first address identifier W:/a/m/x is the new storage sub-area. If the remaining N/2 address identifiers include the address identifier W:/a/m/w, the found storage sub-area is used as the target sub-area. When N address identifiers are not stored in the storage sub-area $A_n$, the remaining capacity indicates non-full storage. In this case, the server may directly use $A_n$ as the target sub-area.

S206: The server performs data updating for the second area according to updated data in the first area.

In some embodiments, when a new storage sub-area is created in the first area, data may need to be updated for the second area. In this case, the server performing the data updating for the second area may include creating, by the server, a pointer of the new storage sub-area, and storing the pointer in the second area.

For example, the server may create the pointer according to N/2 address identifiers already stored in the new storage sub-area and location information of the new storage sub-area.

S207: When needing to perform a traversal operation on the parent directory, the server obtains the second address identifier of the parent directory, and searches for the corresponding information storage area according to the second address identifier.

For example, when receiving a traversal request sent by a terminal and carrying the second address identifier W:/a/m/, the server may find the information storage area A according to the second address identifier W:/a/m/.

S208: The server sends a traversal condition setting request to a terminal, so that the terminal feeds back corresponding setting information according to the traversal condition setting request.

For example, the server may send the traversal condition setting request to the terminal by using a network. After receiving the request, the terminal may provide an input box to a user to enter setting information, for example, the user may set a traversal range or a traversal quantity by using the input box; and then, the terminal may send the setting information to the server.

S209: The server obtains corresponding data from the information storage area according to the setting information, to traverse objects stored in the parent directory, where the object includes a subdirectory or a sub-file.

In some embodiments, the server obtaining the corresponding data from the information storage area according to the setting information to traverse the objects stored in the parent directory may include obtaining, by the server, a corresponding pointer from the second area in the information storage area according to the setting information; searching, by the server, the first area in the information storage area for a corresponding storage sub-area according to the pointer; and obtaining, by the server, the corresponding data from the storage sub-area according to the setting information.

For example, when the setting information includes a setting to traverse all address identifiers within a range from W:/a/m/c to W:/a/m/s, two pointers may be obtained from the second area, and 10 address identifiers may be stored in a storage sub-area to which one pointer points. Afterwards, only five address identifiers in total may be obtained by the server according to the traversal range from the storage sub-areas to which the pointers point, which may be, for example, W:/a/m/d, W:/a/m/h, W:/a/m/j, W:/a/m/p, and W:/a/m/r.

S210: The server obtains the first address identifier of the target object, and determines the information storage area according to the first address identifier when the target object is deleted.

For example, when the user deletes the sub-file, the server determines the second address identifier W:/a/m/ according to the first address identifier W:/a/m/x of the sub-file, and finds the information storage area A according to the second address identifier W:/a/m/. The information storage area A is a metadata storage area of a parent directory to which the sub-file belongs.

S211: The server searches the first area in the information storage area according to the first address identifier, to obtain the target sub-area.

For example, the server may find a storage sub-area, that is, the target sub-area, of the first address identifier W:/a/m/x from the first area by means of dichotomic search.

S212: The server detects a current storage status of the target sub-area, and deletes corresponding data from the information storage area according to the storage status.

In some embodiments, deleting, by the server, the corresponding data from the information storage area according to the storage status may include deleting, by the server, the target sub-area from the first area, and deleting a pointer corresponding to the target sub-area from the second area when the storage status indicates that one piece of data is already stored. In some other embodiments, deleting, by the server, the corresponding data from the information storage area according to the storage status may include deleting, by the server, the second address identifier from the target sub-area when the storage status indicates that multiple pieces of data are already stored.

For example, only the first address identifier W:/a/m/x is stored in the target sub-area. In this scenario, when W:/a/m/x is deleted, the target sub-area and the pointer corresponding to the target sub-area may also need to be deleted. As another example, W:/a/m/x and W:/a/m/s are stored in the target sub-area. In this scenario, only W:/a/m/x may need to be deleted.

It should be noted that, an order between processes S207 to S209 and processes S210 to S212 is not limited, and the steps may be parallel steps.

In view of the above, according to the object information processing method provided in some embodiments, an information creation request is obtained, the information creation request carrying a first address identifier of a target object; a second address identifier of a parent directory to which the target object belongs is determined according to the first address identifier; a corresponding information storage area is searched for according to the second address identifier, the information storage area being used to store metadata of the parent directory, the information storage area including a first area and a second area, the first area including multiple created storage sub-areas, the second area including multiple stored pointers, and each pointer pointing to one of the storage sub-areas; then, the first area is searched for a corresponding storage sub-area according to the first address identifier, and a current remaining capacity of a found storage sub-area is detected; and a target sub-area in the first area is determined according to the remaining capacity, the first address identifier is stored in the target sub-area, to perform data updating for the first area, and data is updated for the second area according to updated data in the first area. As such, a disadvantage that there is no directory structure for object storage can be overcome, and a hierarchical directory structure in an object storage system can be rapidly created. After the hierarchical directory structure is created, when the target object is deleted, the first address identifier of the target object may be obtained, and the information storage area is determined according to the first address identifier; then, the first area in the information storage area is searched according to the first address identifier, to obtain the target sub-area; a current storage status of the target sub-area is detected; and corresponding data is deleted from the information storage area according to the storage status. As such, the hierarchical directory structure can be updated according to an actual operation of a user, and the method is simple. When a traversal operation needs to be performed on the parent directory, the second address identifier of the parent directory is obtained, and the corresponding information storage area is searched for according to the second address identifier; then a traversal condition setting request is sent to a terminal, so that the terminal feeds back corresponding setting information according to the traversal condition setting request; and corresponding data is obtained from the information storage area according to the setting information, to traverse objects stored in the parent directory, so that a traversal function for a file in a directory can be implemented by using the created hierarchical directory structure. Traversal efficiency is high and user experience is good.

Figure 3A:
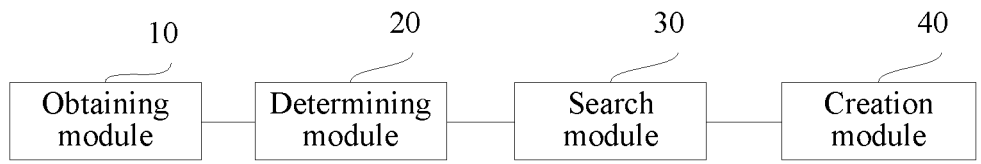
FIG. 3a is a schematic structural diagram of an object information processing apparatus according to an embodiment of this disclosure.

The disclosure further provides an object information processing apparatus. As shown in FIG. 3a, the object information processing apparatus may include an obtaining module 10, a determining module 20, a search module 30, and a creation module 40 as follows.

The obtaining module 10 is configured to obtain an information creation request, the information creation request carrying a first address identifier of a target object, and the target object including a subdirectory or a sub-file.

In some embodiments, the first address identifier is mainly storage path information of the target object in the server. Specifically, if an object currently stored in the server is a subdirectory or a sub-file (that is, a target object), the server automatically generates an information creation request.

It should be noted that, it may be considered that an object whose storage path information is ended with "/" is a parent directory or a subdirectory, and an object whose storage path information is not ended with "/" is a file or a sub-file. Generally, multiple subdirectories and sub-files may be stored in one parent directory, the parent directory may belong to a higher-level directory, or may not belong to any directory (for example, the parent directory is a root directory). Storage path information of the parent directory is generally a prefix portion of storage path information of a subdirectory or a sub-file in the parent directory. For example, if an object whose storage path information is W:/a/b is a target object, storage path information corresponding to a parent directory to which the target object belongs is W:/a/, and storage path information corresponding to a higher-level directory (that is, a parent directory of the parent directory) to which the parent directory belongs is W:/.

Not all storage objects are target objects. For example, there is no higher-level directory (a parent directory) for an object whose storage path information is W:/, and therefore, the object is not a subdirectory or a sub-file, that is, the object is not a target object. Therefore, before generating an information creation request, the server further may need to determine whether a storage object is a target object. In some embodiments, the server may determine that the storage object is a target object only when there is a higher-level directory (a parent directory) for the storage object. Shen determining that the storage object is a target object, the server may generate the information creation request.

The determining module 20 is configured to determine, according to the first address identifier, a second address identifier of a parent directory to which the target object belongs.

In some embodiments, the second address identifier may include storage path information of the parent directory. Generally, a subdirectory or a sub-file is stored in a parent directory, and therefore, storage path information of the subdirectory or the sub-file may be highly associated with storage path information of the parent directory. Generally, the determining module 20 may determine a prefix portion of the first address identifier as the second address identifier.

The search module 30 is configured to search for a corresponding information storage area according to the second address identifier, the information storage area being used to store metadata of the parent directory.

In some embodiments, the metadata is mainly used to describe an attribute of object data, and supports a function of indicating a storage location or historical data, resource searching, file recording, or the like. It should be noted that, when storing each object, the server creates metadata of the object based on storage path information of the object.

Therefore, the search module 30 can locate a corresponding information storage area by using storage path information (that is, an address identifier).

The creation module 40 is configured to perform data updating for the information storage area according to the first address identifier, to create an association relationship between the parent directory and the target object in the metadata.

In some embodiments, to facilitate searching, in addition to storing the metadata of the parent directory in the information storage area, the creation module 40 may further create multiple specified areas in the information storage area to store the association relationship between the parent directory and the target object.

For example, the information storage area may include a first area and a second area, and the creation module 40 may include a first update submodule and a second update submodule.

The first update submodule is configured to determine a target sub-area in the first area according to the first address identifier, and store the first address identifier in the target sub-area, to perform data updating for the first area.

The second update submodule is configured to perform data updating for the second area according to updated data in the first area.

Further, the first area may include multiple created storage sub-areas, the second area may include multiple stored pointers, and each pointer points to one of the storage sub-areas. In this case, the first update submodule may include a search unit configured to search the first area for a corresponding storage sub-area according to the first address identifier; a detection unit configured to detect a current remaining capacity of a found storage sub-area; and a determining unit configured to determine the target sub-area in the first area according to the remaining capacity.

It can be understood that, the pointer can be an object in a programming language, and a value of the pointer directly points to a value of another place in the server by using an address. In some embodiments, the storage sub-area is in a one-to-one correspondence with the pointer, and a required storage sub-area can be found by using a pointer. The storage sub-area is used to store an address identifier. Each storage sub-area may include consecutive storage blocks, in which several address identifiers are stored. The address identifiers may be sorted according to a preset order. For example, the address identifiers may be sorted in ascending order according to a lexicographic order. The pointers may be sorted according to a lexicographic order of minimum address identifiers in storage sub-areas to which the pointers point to. The target sub-area may be a created storage sub-area, or may be a to-be-created storage sub-area, and may be specifically determined according to the remaining capacity of the found storage sub-area.

The remaining capacity may include full storage and non-full storage. Hence, in some embodiments, the determining unit may be configured to create a new storage sub-area in the first area when the remaining capacity indicates full storage; migrate a data portion in the found storage sub-area to the new storage sub-area according to a preset policy; and select either the found storage sub-area or the new storage sub-area as the target sub-area according to the first address identifier.

In some embodiments, the preset policy may be equipartition. That is, quantities of address identifiers stored in the found storage sub-area and the new storage sub-area are made to be roughly the same. In this way, frequency of creating a new storage sub-area can be reduced to the greatest extent.

In some embodiments, a quantity of address identifiers that can be stored in each storage sub-area is N. When N address identifiers are already stored in the storage sub-area found by the search unit, the remaining capacity indicates full storage. In this case, if an $(N+1)^{th}$ address identifier (that is, the first address identifier) needs to be stored, the determining unit may create a new storage sub-area in the first area, and migrate N/2 address identifiers stored in the found storage sub-area to the new storage sub-area. If address identifiers in each storage sub-area are sorted according to the lexicographic order, the determining unit may select, according to a ranking of the first address identifier in a dictionary, either the found storage sub-area or the new storage sub-area as the target sub-area for insertion.

In this case, a pointer of a storage sub-area in the first area is stored in the second area. Therefore, when a quantity of storage sub-areas in the first area is increased, that is, the determining unit creates a new storage sub-area, the second update submodule may need to add a corresponding pointer to the second area. Thus, in this case, the second update submodule may be further configured to create a pointer of the new storage sub-area, and store the pointer in the second area.

In some embodiments, the second update submodule may create the pointer according to an address identifier already stored in the new storage sub-area and location information of the new storage sub-area.

In some embodiments, the determining unit may be further configured to use the found storage sub-area as the target sub-area when the remaining capacity indicates non-full storage.

In some embodiments, if N address identifiers are not stored in the found storage sub-area, the remaining capacity indicates non-full storage. In this case, the determining unit may directly use the found storage sub-area as the target sub-area. In this case, the quantity of storage sub-areas in the first area remains unchanged. Therefore, the second update submodule does not need to perform data updating for the second area.

It should be noted that, at the very beginning, no sub-file and no subdirectory are stored in the parent directory. In this case, the creation module 40 may create the first area and the second area in the information storage area of the parent directory. In addition, a first storage sub-area is created in the first area, in which no address identifier is stored, and a first pointer pointing to the first storage sub-area is stored in the second area. When a subdirectory or a sub-file is newly added to the parent directory, an address identifier of the subdirectory or the sub-file is stored in the first storage sub-area, and is sorted according to a specific order. The creation module 40 does not create the second storage sub-area until a remaining capacity of the first storage sub-area indicates full storage, and some address identifiers stored in the first storage sub-area are migrated to the second storage sub-area, so that a new address identifier can be stored in either the first storage sub-area or the second storage sub-area, and meanwhile, a second pointer pointing to the second storage sub-area is added to the second area. A same method may be used to create a third storage sub-area to an $M^{th}$ storage sub-area, and a third pointer to an $M^{th}$ pointer. Details are not described herein again.

Figure 3B:
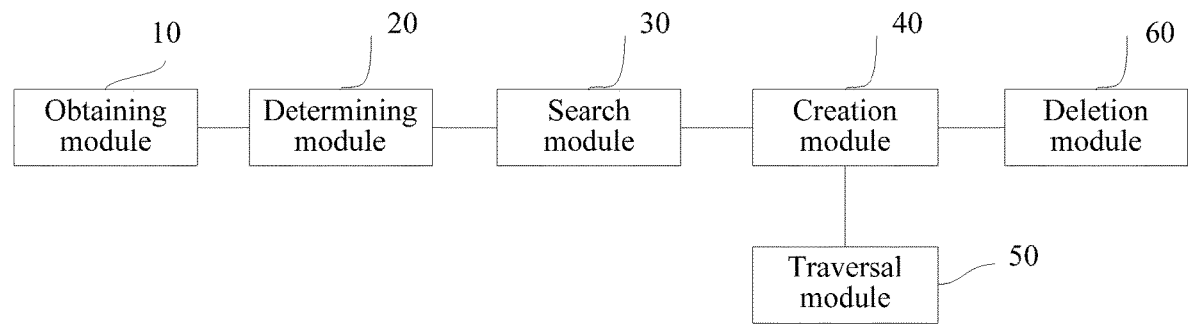
FIG. 3b is another schematic structural diagram of an object information processing apparatus according to an embodiment of this disclosure.

When each sub-file or subdirectory is stored, if the creation module 40 creates an association relationship between the sub-file or the subdirectory and a parent directory thereof in corresponding metadata, subsequently, a user may perform a traversal operation on the parent directory according to an actual requirement. That is, referring to FIG. 3b, the object information processing apparatus may further include a traversal module 50. The traversal module 50 may include a second obtaining submodule, a second search submodule, a sending submodule, and a third obtaining submodule.

The second obtaining submodule is configured to, after the creation module 40 performs data updating for the information storage area according to the first address identifier, obtain the second address identifier of the parent directory when a traversal operation needs to be performed on the parent directory.

The second search submodule is configured to search for the corresponding information storage area according to the second address identifier.

The sending submodule is configured to send a traversal condition setting request to a terminal, so that the terminal feeds back corresponding setting information according to the traversal condition setting request.

The third obtaining submodule is configured to obtain corresponding data from the information storage area according to the setting information, to traverse objects stored in the parent directory, where the object includes a subdirectory or a sub-file.

In some embodiments, the terminal may be a device such as a computer, a mobile phone, or a tablet computer. The traversal condition may be determined according to an actual requirement of the user, for example, a preset traversal range, a preset traversal quantity, or traversing all content. The traversal condition may be transferred to the server by using a preset interface in the terminal, and the preset interface may be a specified interface of an application interface.

In some embodiments, the third obtaining submodule may be further configured to obtain a corresponding pointer from the second area in the information storage area according to the setting information; search the first area in the information storage area for a corresponding storage sub-area according to the pointer; and obtain the corresponding data from the storage sub-area according to the setting information.

In some embodiments. When receiving the setting information such as the preset traversal range fed back by the terminal, the third obtaining submodule may first find a corresponding pointer according to the preset traversal range, find a corresponding storage sub-area according to the pointer, and then select an address identifier within the preset traversal range from the storage sub-area.

In addition, after the creation module 40 creates the association relationship between the target object and the parent directory in the metadata, if subsequently, the user deletes the target object from an object storage system, the association relationship may also need to be correspondingly deleted. That is, the object information processing apparatus may further include a deletion module 60. The deletion module 60 may specifically include a first obtaining submodule, a determining submodule, a first search submodule, a detection submodule, and a deletion submodule.

The first obtaining submodule is configured to after the creation module 40 performs data updating for the information storage area according to the first address identifier, obtain the first address identifier of the target object when the target object is deleted.

The determining submodule is configured to determine the information storage area according to the first address identifier.

The first search submodule is configured to search the first area in the information storage area according to the first address identifier, to obtain the target sub-area.

The detection submodule is configured to detect a current storage status of the target sub-area.

The deletion submodule is configured to delete corresponding data from the information storage area according to the storage status.

In some embodiments, the storage status may include that one piece of data is already stored and multiple pieces of data are already stored. For details of a method for determining the information storage area, description above regarding processes performed by the determining module 20 and the search module 30 can be referred to, and details are not described herein again. A method for searching for the target sub-area by the first search submodule may be determined according to an actual requirement. For example, if address identifiers stored in the first area are sorted in ascending order according to the lexicographic order, the searching method used by the first search submodule may be a dichotomic search method.

In some embodiments, the deletion submodule may be further configured to delete the target sub-area from the first area, and delete a pointer corresponding to the target sub-area from the second area when the storage status indicates that one piece of data is already stored. In some other embodiments, the deletion submodule may be further configured to delete the second address identifier from the target sub-area when the storage status indicates that multiple pieces of data are already stored.

In some embodiments, when only one piece of data (that is, the first address identifier) is stored in the target sub-area, if the deletion submodule deletes the first address identifier, storage in the target sub-area becomes empty. To avoid a waste of space, both the target sub-area and the pointer corresponding to the target sub-area should be deleted. When multiple pieces of data (that is, multiple address identifiers including the first address identifier) are stored in the target sub-area, after the deletion submodule deletes the first address identifier, storage in the target sub-area is not empty. Therefore, another deletion operation does not need to be performed.

During specific implementation, the foregoing units may be implemented as independent entities, or may be combined arbitrarily, or may be implemented as a same entity or several entities. For specific implementation of the foregoing units, the foregoing method embodiments can be referred to. Details are not described herein again.

In view of the above, according to the object information processing apparatus provided in some embodiments, the obtaining module 10 obtains an information creation request, the information creation request carrying a first address identifier of a target object; the determining module 20 determines, according to the first address identifier, a second address identifier of a parent directory to which the target object belongs; then, the search module 30 searches for a corresponding information storage area according to the second address identifier; and the creation module 40 performs data updating for the information storage area according to the first address identifier, so that a hierarchical directory structure in an object storage system can be rapidly created. An operation is simple and processing efficiency is high.

Some embodiments of this disclosure further provides an object information processing system, including any one of the object information processing apparatuses provided in the embodiments of this disclosure. For details, description above of the object information processing apparatuses in connection with FIGS. 3a and 3b can be referred to. The object information processing apparatus may be integrated in a device such as a server.

The object information processing apparatus in the server is configured to obtain an information creation request, the information creation request carrying a first address identifier of a target object, and the target object including a subdirectory or a sub-file; determine, according to the first address identifier, a second address identifier of a parent directory to which the target object belongs; search for a corresponding information storage area according to the second address identifier, the information storage area being used to store metadata of the parent directory; and perform data updating for the information storage area according to the first address identifier, to create an association relationship between the parent directory and the target object in the metadata.

In addition, optionally, the object information processing system may further include another device, for example, a user terminal. The user terminal may generate corresponding setting information according to an input operation of a user, and send the setting information to the server, or the like.

For a specific operation of each of the foregoing devices, the foregoing embodiments can be referred to, and details are not described herein again.

The object information processing system may include any one of the object information processing apparatuses provided in the embodiments of this disclosure, and therefore, can achieve the beneficial effects that can be achieved by any one of the object information processing apparatuses provided in the embodiments of this disclosure. For details, the foregoing embodiments can be referred to, and details are not described herein again.

Figure 4:
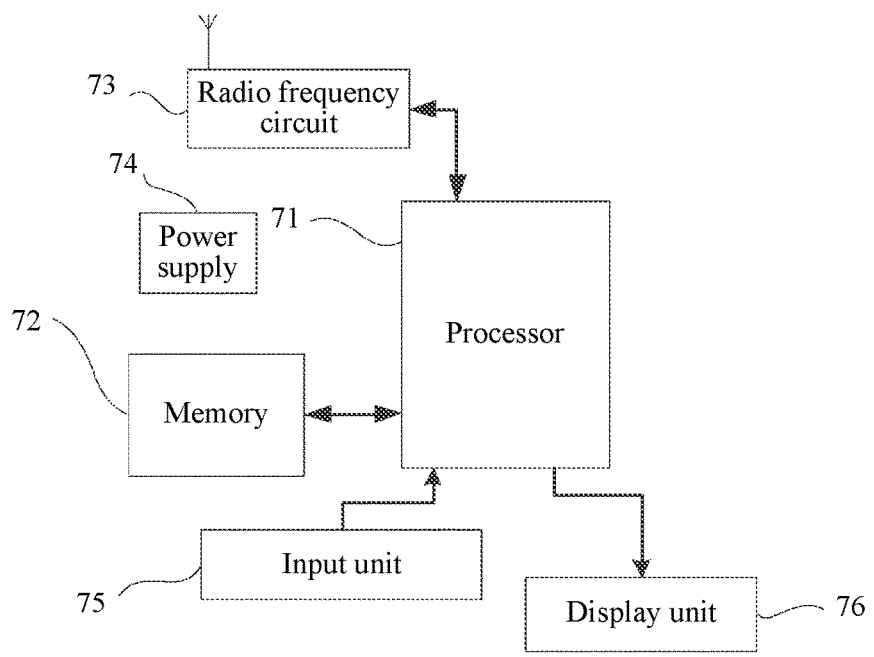
FIG. 4 is a schematic structural diagram of a server according to an embodiment of this disclosure.

Some embodiments of this disclosure further provide a server. Any one of the object information processing apparatuses provided in the embodiments of this disclosure may be integrated in the server. FIG. 4 is a schematic structural diagram of the server used in some embodiments of this disclosure. Specifically, the server may include components such as a processor 71 including one or more processing cores, a memory 72 including one or more computer readable storage media, a radio frequency (RF) circuit 73, a power supply 74, an input unit 75, and a display unit 76. A person skilled in the art may understand that the server structure shown in FIG. 4 does not constitute a limitation to the server. The server may include more or fewer components than those shown in the figure, may combine some components, or may have different component arrangements.

The processor 71 is a control center of the server, and is connected to various parts of the entire server by using various interfaces and lines. By running or executing a software program and/or module stored in the memory 72, and reading data stored in the memory 72, the processor 71 may perform various functions of the server and perform data processing, thereby monitoring the entire server. Optionally, the processor 71 may include one or more processor cores. In some embodiments, the processor 71 may include an application processor and a modem processor. The application processor may mainly process an operating system, a user interface, an application program, and/or the like. The modem processor may mainly process wireless communication. It may be understood that the foregoing modem processor may be not integrated in the processor 71.

The memory 72 may be configured to store a software program and/or module. The processor 71 may run the software program and/or module stored in the memory 72, thereby implementing various function applications and data processing. The memory 72 may mainly include a program storage area and a data storage area. The program storage area may store an operating system, an application program required by at least one function (such as a sound playing function and an image display function), and/or the like. The data storage area may store data created according to use of the server, and/or the like. In addition, the memory 72 may include a high-speed random access memory (RAM), and may further include a non-volatile memory, such as at least one magnetic disk storage device, a flash memory, or another volatile solid-state storage device. In some embodiments, the memory 72 may further include a memory controller, to provide access of the processor 71 to the memory 72.

The RF circuit 73 may be configured to receive and send a signal during information transmission and receiving. In some embodiments, the RF circuit 71 may send, after receiving downlink information of a base station, the information to one or more processors 71 for processing, and sends involved uplink data to the base station. Generally, the RF circuit 73 may include, but is not limited to, an antenna, at least one amplifier, a tuner, one or more oscillators, a subscriber identity module (SIM) card, a transceiver, a coupler, a low noise amplifier (LNA), a duplexer, and/or the like. In addition, the RF circuit 73 may further communicate with a network and another device by wireless communication. The wireless communication may use any communication standard or protocol, which includes, but is not limited to, a Global System for Mobile Communications (GSM), a general packet radio service (GPRS), Code Division Multiple Access (CDMA), Wideband Code Division Multiple Access (WCDMA), Long Term Evolution (LTE), e-mail, Short Message Service (SMS), and/or the like.

The server further includes the power supply 74 (for example, a battery) that supplies power to each component. In some embodiments, the power supply 74 may be logically connected to the processor 71 by using a power supply management system, so that functions such as management of charging, discharging, and power consumption are implemented by using the power supply management system. The power supply 74 may further include one or more of a direct current or alternating current power supply, a re-charging system, a power failure detection circuit, a power supply converter or inverter, a power supply state indicator, or another component.

The server may further include the input unit 75. The input unit 75 may be configured to receive entered numeric or character information and generate keyboard, mouse, joystick, optical, or trackball signal input related to user settings and function control. In some embodiments, the input unit 75 may include a touch-sensitive surface or another input device. The touch-sensitive surface, which may include a touchscreen and/or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. Optionally, the touch-sensitive surface may include two parts: a touch detection apparatus and a touch controller.

The touch detection apparatus may detect a touch position of the user, detect a signal generated by the touch operation, and transfer the signal to the touch controller. The touch controller may receive touch information from the touch detection apparatus, convert the touch information into touch point coordinates, and send the touch point coordinates to the processor 71. Moreover, the touch controller can receive and execute a command sent by the processor 71. In addition, the touch-sensitive surface may be implemented in one of multiple types, such as a resistive type, a capacitive type, an infrared type, and a surface acoustic wave type. In addition to the touch-sensitive surface, the input unit 75 may further include another input device. In some embodiments, the another input device may include, but is not limited to, one or more of a physical keyboard, a function key (for example, a volume control key or a power on/off key), a trackball, a mouse, or a joystick.

The server may further include the display unit 76. The display unit 76 may be configured to display information entered by the user or information provided to the user, and graphical user interfaces of the server. The graphical user interfaces each may include an image, text, an icon, a video, or any combination thereof. The display unit 76 may include a display panel. Optionally, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface may transfer the touch operation to the processor 71 to determine a type of a touch event, and then the processor 71 may provide corresponding visual output on the display panel according to the type of the touch event. Although in FIG. 4, the touch-sensitive surface and the display panel are depicted as two separate parts to implement input and output functions, in some embodiments, the touch-sensitive surface and the display panel may be integrated to implement the input and output functions.

Although not shown, the server may further include a camera, a Bluetooth module, and/or the like. Details are not described herein. In some embodiments, the processor 71 of the server may load, according to the following instructions, executable files corresponding to processes of one or more application programs into the memory 72. The processor 71 may run the application programs stored in the memory 72, to implement a method consistent with the disclosure, such as one of the above-described example methods. In some embodiments, the program stored in the memory 72 may cause the processor 71 to implement a method including obtaining an information creation request, the information creation request carrying a first address identifier of a target object, and the target object including a subdirectory or a sub-file; determining, according to the first address identifier, a second address identifier of a parent directory to which the target object belongs; searching for a corresponding information storage area according to the second address identifier, the information storage area being used to store metadata of the parent directory; and performing data updating for the information storage area according to the first address identifier, to create an association relationship between the parent directory and the target object in the metadata.

For an implementation method of each operation, the foregoing embodiments can be referred to, and details are not described herein again.

In view of the above, the server provided in some embodiments obtains an information creation request, the information creation request carrying a first address identifier of a target object; determines, according to the first address identifier, a second address identifier of a parent directory to which the target object belongs; then, searches for a corresponding information storage area according to the second address identifier; and performs data updating for the information storage area according to the first address identifier, so that a hierarchical directory structure in an object storage system can be rapidly created, thereby implementing a traversal function for a file list in a directory. An operation is simple and traversal efficiency is high.

A person of ordinary skill in the art may understand that all or some of the processes of the methods in the foregoing embodiments may be implemented by a program instructing relevant hardware. The program may be stored in a computer readable storage medium. The storage medium may include: a read-only memory (ROM), a RAM, a magnetic disk, an optical disc, or the like.

The object information processing method, apparatus, and system provided in the embodiments of this disclosure are described above. Although the principles and implementations of this disclosure are described by using specific examples in this specification, the descriptions of the foregoing embodiments are merely intended to assist understanding of the method and the core idea of the method in this disclosure. Meanwhile, a person skilled in the art may make modifications to the specific implementations and application range according to the idea of this disclosure. The content of this specification should not be construed as a limitation to this disclosure.

What is claimed is:

1. An object information processing method, applied to a server, the method comprising:
    obtaining an information creation request, the information creation request carrying a first address identifier of a target object, and the target object including a subdirectory or a sub-file sent from a user terminal for storage at the server;
    determining, according to the first address identifier, a second address identifier of a parent directory to which the target object belongs;
    searching for an information storage area according to the second address identifier, the information storage area storing metadata of the parent directory, wherein the information storage area includes a first area and a second area, and wherein the first area includes multiple created storage sub-areas, the second area includes multiple stored pointers, and each of the pointers points to one of the storage sub-areas;
    performing data updating for the information storage area according to the first address identifier, to create an association relationship between the parent directory and the target object in the metadata, by:
        determining a target sub-area in the first area according to the first address identifier, by searching the first area for a corresponding storage sub-area according to the first address identifier, by detecting a remaining capacity of the corresponding storage sub-area, and by determining the target sub-area in the first area according to the remaining capacity;
        storing the first address identifier in the target sub-area, to perform data updating for the first area to obtain updated data; and
        performing data updating for the second area according to the updated data in the first area;

obtaining the second address identifier of the parent directory in response to receiving an instruction to perform a traversal operation on the parent directory;
searching for the information storage area according to the second address identifier;
sending a traversal condition setting request to the user terminal;
receiving, from the user terminal, setting information corresponding to the traversal condition setting request;
obtaining corresponding data from the information storage area according to the setting information, to traverse objects stored in the parent directory, each of the objects including a subdirectory or a sub-file, by:
  obtaining a corresponding pointer from the second area in the information storage area according to the setting information;
  searching the first area in the information storage area for a corresponding storage sub-area according to the corresponding pointer; and
  obtaining the corresponding data from the corresponding storage sub-area according to the setting information; and
communicating to the user terminal that the target object is stored at the server according to the corresponding data.

2. The object information processing method according to claim 1, wherein determining the target sub-area in the first area according to the remaining capacity includes:
creating a new storage sub-area in the first area in response to the remaining capacity indicating a full storage in the corresponding storage sub-area;
migrating a portion of data from the corresponding storage sub-area to the new storage sub-area according to a preset policy; and
selecting the corresponding storage sub-area or the new storage sub-area as the target sub-area according to the first address identifier.

3. The object information processing method according to claim 1, further comprising, after performing the data updating for the information storage area according to the first address identifier:
obtaining the first address identifier of the target object in response to the target object being deleted;
determining the information storage area according to the first address identifier;
searching the first area in the information storage area according to the first address identifier, to obtain the target sub-area;
detecting a current storage status of the target sub-area; and
deleting corresponding data from the information storage area according to the current storage status.

4. The object information processing method according to claim 3, wherein deleting the corresponding data from the information storage area according to the current storage status includes:
in response to the current storage status indicating that one piece of data is already stored in the target sub-area, deleting the target sub-area from the first area and deleting a pointer corresponding to the target sub-area from the second area; or
in response to the current storage status indicating that multiple pieces of data are already stored in the target sub-area, deleting the second address identifier from the target sub-area.

5. The object information processing method according to claim 1, wherein performing the data updating for the second area according to the updated data in the first area includes:
creating a new storage sub-area in the first area in response to the remaining capacity indicating a full storage in the corresponding storage sub-area;
creating a pointer for the new storage sub-area; and
storing the pointer for the new storage sub-area in the second area.

6. An object information processing apparatus comprising: one or more processors; and one or more memories storing one or more programs that, when executed by the one or more processors, cause the one or more processors to:
obtain an information creation request, the information creation request carrying a first address identifier of a target object, and the target object including a subdirectory or a sub-file sent from a user terminal for storage at the object information processing apparatus;
determine, according to the first address identifier, a second address identifier of a parent directory to which the target object belongs;
search for an information storage area according to the second address identifier, the information storage area storing metadata of the parent directory, wherein the information storage area includes a first area and a second area, and wherein the first area includes multiple created storage sub-areas, the second area includes multiple stored pointers, and each of the pointers points to one of the storage sub-areas;
perform data updating for the information storage area according to the first address identifier, to create an association relationship between the parent directory and the target object in the metadata, by:
  determining a target sub-area in the first area according to the first address identifier, by searching the first area for a corresponding storage sub-area according to the first address identifier, by detecting a remaining capacity of the corresponding storage sub-area, and by determining the target sub-area in the first area according to the remaining capacity;
  storing the first address identifier in the target sub-area, to perform data updating for the first area to obtain updated data; and
  performing data updating for the second area according to the updated data in the first area;
obtain the second address identifier of the parent directory in response to receiving an instruction to perform a traversal operation on the parent directory;
search for the information storage area according to the second address identifier;
send a traversal condition setting request to the user terminal;
receive, from the user terminal, setting information corresponding to the traversal condition setting request;
obtain corresponding data from the information storage area according to the setting information, to traverse objects stored in the parent directory, each of the objects including a subdirectory or a sub-file, by:
  obtaining a corresponding pointer from the second area in the information storage area according to the setting information;
  searching the first area in the information storage area for a corresponding storage sub-area according to the corresponding pointer; and obtaining the corresponding data from the corresponding storage sub-area according to the setting information; and communicate to the user terminal that the target object is stored at the server according to the corresponding data.

7. The object information processing apparatus according to claim 6, wherein the one or more programs further cause the one or more processors to:
   create a new storage sub-area in the first area in response to the remaining capacity indicating a full storage in the corresponding storage sub-area;
   migrate a portion of data from the corresponding storage sub-area to the new storage sub-area according to a preset policy; and
   select the corresponding storage sub-area or the new storage sub-area as the target sub-area according to the first address identifier.

8. The object information processing apparatus according to claim 6, wherein the one or more programs further cause the one or more processors to, after performing the data updating for the information storage area according to the first address identifier:
   obtain the first address identifier of the target object in response to the target object being deleted;
   determine the information storage area according to the first address identifier;
   search the first area in the information storage area according to the first address identifier, to obtain the target sub-area;
   detect a current storage status of the target sub-area; and
   delete corresponding data from the information storage area according to the current storage status.

9. The object information processing apparatus according to claim 8, wherein the one or more programs further cause the one or more processors to:
   in response to the current storage status indicating that one piece of data is already stored in the target sub-area, delete the target sub-area from the first area and deleting a pointer corresponding to the target sub-area from the second area; or
   in response to the current storage status indicating that multiple pieces of data are already stored in the target sub-area, delete the second address identifier from the target sub-area.

10. The object information processing apparatus according to claim 6, wherein the one or more programs further cause the one or more processors to:
    create a new storage sub-area in the first area in response to the remaining capacity indicating a full storage in the corresponding storage sub-area;
    create a pointer for the new storage sub-area; and
    store the pointer for the new storage sub-area in the second area.

11. A non-transitory computer readable storage medium, storing computer readable instructions that, when executed by at least one processor of a server, cause the at least one processor to:
    obtain an information creation request, the information creation request carrying a first address identifier of a target object, and the target object including a subdirectory or a sub-file sent from a user terminal for storage at the server;
    determine, according to the first address identifier, a second address identifier of a parent directory to which the target object belongs;
    search for an information storage area according to the second address identifier, the information storage area storing metadata of the parent directory, wherein the information storage area includes a first area and a second area, and wherein the first area includes multiple created storage sub-areas, the second area includes multiple stored pointers, and each of the pointers points to one of the storage sub-areas;
    perform data updating for the information storage area according to the first address identifier, to create an association relationship between the parent directory and the target object in the metadata, by:
       determining a target sub-area in the first area according to the first address identifier, by searching the first area for a corresponding storage sub-area according to the first address identifier, by detecting a remaining capacity of the corresponding storage sub-area, and by determining the target sub-area in the first area according to the remaining capacity;
       storing the first address identifier in the target sub-area, to perform data updating for the first area to obtain updated data; and
       performing data updating for the second area according to the updated data in the first area;
    obtain the second address identifier of the parent directory in response to receiving an instruction to perform a traversal operation on the parent directory;
    search for the information storage area according to the second address identifier;
    send a traversal condition setting request to the user terminal;
    receive, from the user terminal, setting information corresponding to the traversal condition setting request;
    obtain corresponding data from the information storage area according to the setting information, to traverse objects stored in the parent directory, each of the objects including a subdirectory or a sub-file, by:
       obtaining a corresponding pointer from the second area in the information storage area according to the setting information;
       searching the first area in the information storage area for a corresponding storage sub-area according to the corresponding pointer; and
       obtaining the corresponding data from the corresponding storage sub-area according to the setting information; and
    communicate to the user terminal that the target object is stored at the server according to the corresponding data.

12. The non-transitory computer readable storage medium according to claim 11, wherein the computer readable instructions further cause the at least one processor to:
    create a new storage sub-area in the first area in response to the remaining capacity indicating a full storage in the corresponding storage sub-area;
    migrate a portion of data from the corresponding storage sub-area to the new storage sub-area according to a preset policy; and
    select the corresponding storage sub-area or the new storage sub-area as the target sub-area according to the first address identifier.

13. The non-transitory computer readable storage medium according to claim 11, wherein the computer readable instructions further cause the at least one processor to:
    create a new storage sub-area in the first area in response to the remaining capacity indicating a full storage in the corresponding storage sub-area;

create a pointer for the new storage sub-area; and
store the pointer for the new storage sub-area in the second area.

\* \* \* \* \*